United States Patent
Motegi et al.

(10) Patent No.: US 10,345,500 B2
(45) Date of Patent: Jul. 9, 2019

(54) POLARIZING FILM, PRESSURE-SENSITIVE-ADHESIVE-LAYER-ATTACHED POLARIZING FILM, AND IMAGE DISPLAY DEVICE AND METHOD FOR CONTINUOUSLY PRODUCING SAME

(71) Applicant: NITTO DENKO CORPORATION, Ibaraki-shi, Osaka (JP)

(72) Inventors: Yusuke Motegi, Ibaraki (JP); Satoshi Mita, Ibaraki (JP); Tomonori Ueno, Ibaraki (JP); Atsushi Kishi, Ibaraki (JP); Jingfan Xu, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 66 days.

(21) Appl. No.: 15/549,788

(22) PCT Filed: Feb. 9, 2016

(86) PCT No.: PCT/JP2016/053768
§ 371 (c)(1),
(2) Date: Aug. 9, 2017

(87) PCT Pub. No.: WO2016/129584
PCT Pub. Date: Aug. 18, 2016

(65) Prior Publication Data
US 2018/0024283 A1    Jan. 25, 2018

(30) Foreign Application Priority Data

Feb. 13, 2015 (JP) .................. 2015-026602
Feb. 5, 2016 (JP) .................. 2016-020970

(51) Int. Cl.
*G02B 5/30* (2006.01)
*B32B 27/30* (2006.01)

(52) U.S. Cl.
CPC .............. *G02B 5/305* (2013.01); *B32B 27/30* (2013.01)

(58) Field of Classification Search
CPC ........ G02B 1/14; G02B 5/3035; G02B 5/305; B32B 27/30
(Continued)

(56) References Cited

U.S. PATENT DOCUMENTS

2001/0024322 A1    9/2001  Harita et al.
2006/0066011 A1*   3/2006  Oya ..................... B29D 7/01
                                                           264/330

(Continued)

FOREIGN PATENT DOCUMENTS

CN    102313923 A    1/2012
CN    103403587 A    11/2013
(Continued)

OTHER PUBLICATIONS

Notification of Transmittal of Translation of the International Preliminary Report on Patentability (Form PCT/IB/338) issued in counterpart International Application No. PCT/JP2016/053768, dated Aug. 24, 2017, with Forms PCT/IB/373 and PCT/ISA/237. (9 pages).

(Continued)

*Primary Examiner* — Ricky D Shafer
(74) *Attorney, Agent, or Firm* — Westerman, Hattori, Daniels & Adrian, LLP (57) ABSTRACT

The present invention pertains to a polarizing film having a transparent resin layer on at least one side of a polarizer containing a polyvinyl alcohol-based resin, wherein the transparent resin layer has a thickness of 0.2 μm or more and is formed from a layer-forming material containing a polyvinyl alcohol-based resin having a saponification degree of 96 mol % or more, and wherein the combined total content (Continued)

of sodium acetate and potassium acetate contained in the transparent resin layer is less than 1 wt %. This polarizing film has crack-resistant properties, and can minimize degradation of the optical characteristics in a heating and humidifying test.

18 Claims, 2 Drawing Sheets

(58) Field of Classification Search
USPC .................................................. 358/487.02
See application file for complete search history.

(56) References Cited

U.S. PATENT DOCUMENTS

| | | | |
|---|---|---|---|
| 2008/0003444 A1* | 1/2008 | Oya | B29C 41/28 428/532 |
| 2010/0196720 A1* | 8/2010 | Kato | C08G 64/0208 428/412 |
| 2010/0209723 A1 | 8/2010 | Tanaka et al. | |
| 2011/0043733 A1 | 2/2011 | Suzuki et al. | |
| 2012/0055607 A1 | 3/2012 | Kitagawa et al. | |
| 2012/0055608 A1 | 3/2012 | Kitagawa et al. | |
| 2012/0055621 A1 | 3/2012 | Goto et al. | |
| 2012/0055622 A1 | 3/2012 | Kitagawa et al. | |
| 2012/0055623 A1 | 3/2012 | Kitagawa et al. | |
| 2012/0056211 A1 | 3/2012 | Kitagawa et al. | |
| 2012/0056340 A1 | 3/2012 | Kitagawa et al. | |
| 2012/0057104 A1 | 3/2012 | Kitagawa et al. | |
| 2012/0057231 A1 | 3/2012 | Goto et al. | |
| 2012/0058291 A1 | 3/2012 | Kitagawa et al. | |
| 2012/0058321 A1 | 3/2012 | Goto et al. | |
| 2012/0320459 A1 | 12/2012 | Akari et al. | |
| 2014/0016195 A1 | 1/2014 | Shouhi et al. | |
| 2015/0109667 A1* | 4/2015 | Shimizu | G02B 5/3033 359/489.07 |

FOREIGN PATENT DOCUMENTS

| | | |
|---|---|---|
| CN | 104212386 A | 12/2014 |
| JP | 10-325907 A | 12/1998 |
| JP | 2001-311828 A | 11/2001 |
| JP | 2004-226707 A | 8/2004 |
| JP | 2005-43858 A | 2/2005 |
| JP | 2009-280784 A | 12/2009 |
| JP | 2010-9027 A | 1/2010 |
| JP | 2013-68804 A | 4/2013 |
| JP | 2013-160775 A | 8/2013 |
| JP | 2013-254072 A | 12/2013 |
| TW | 201317114 A | 5/2013 |

OTHER PUBLICATIONS

International Search Report dated May 17, 2016, issued in counterpart application No. PCT/JP2016/053768. (2 pages).
Notification of Reasons for Refusal dated Aug. 23, 2016, issued in counterpart Japanese Patent Application No. 2016-020970, w/English translation (8 pages).
Notification of Reasons for Refusal dated Dec. 22, 2016, issued in counterpart Japanese Patent Application No. 2016-020970, w/English translation (7 pages).
Decision to Grant a Patent dated Mar. 10, 2017, Issued in counterpart Japanese Patent Application No. 2016-020970, w/English translation (6 pages).
Office Action dated May 8, 2019, issued in counterpart CN Application No. 201680009480.5, with English translation (18 pages).

* cited by examiner

POLARIZING FILM, PRESSURE-SENSITIVE-ADHESIVE-LAYER-ATTACHED POLARIZING FILM, AND IMAGE DISPLAY DEVICE AND METHOD FOR CONTINUOUSLY PRODUCING SAME

TECHNICAL FIELD

The invention relates to a polarizing film. The invention also relates to a pressure-sensitive-adhesive-layer-attached polarizing film produced with the polarizing film. The polarizing film or the pressure-sensitive-adhesive-layer-attached polarizing film maybe used alone or as a component of a multilayer optical film to form an image display device such as a liquid crystal display (LCD) or an organic electroluminescent (EL) display.

BACKGROUND ART

The image forming system of liquid crystal display devices has polarizing films placed as essential components on both sides of glass substrates that form the liquid crystal panel surfaces. A polarizing film generally used includes a polarizer and a protective film or films bonded to one or both surfaces of the polarizer with a polyvinyl alcohol-based adhesive or any other adhesive, in which the polarizer includes a polyvinyl alcohol-based film and a dichroic material such as iodine.

Polarizing films also have a problem in that in a harsh environment accompanied by thermal shock (e.g., a high-temperature test at 95° C. for 250 hours), the polarizer undergoes changes in shrinkage stress, so that cracks can easily occur entirely in the direction of the absorption axis of the polarizer. In other words, polarizing films have insufficient resistance to thermal shock-induced cracking in the harsh environment. In particular, a one-side-protected polarizing film including a polarizer and a protective film that is provided on only one surface of the polarizer for thickness reduction has a problem in that excessive stress can occur inside the polarizer due to the difference between the shrinkage stress on the protective film side of the polarizer and the shrinkage stress on the opposite side of the polarizer from the protective film, so that various cracks can easily occur, including very small cracks of several hundred μm in the absorption axis direction of the polarizer and through cracks passing through the entire surface.

In order to suppress the occurrence of the cracks, for example, it is proposed to provide a pressure-sensitive-adhesive-layer-attached polarizing film including a one-side-protected polarizing film, a protective layer provided on the polarizing film and having a tensile elastic modulus of 100 MPa or more, and a pressure-sensitive adhesive layer provided on the protective layer (Patent Document 1). It is also proposed to provide a pressure-sensitive-adhesive-layer-attached polarizing film including a polarizer with a thickness of 25 μm or less, a protective layer provided on one surface of the polarizer and including a product obtained by curing a curable resin composition, a protective film provided on the other surface of the polarizer, and a pressure-sensitive adhesive layer provided on the outer side of the protective layer (Patent Document 2). The pressure-sensitive-adhesive-layer-attached polarizing films described in Patent Documents 1 and 2 are effective in terms of suppressing the occurrence of cracks. In view of suppression of the occurrence of cracks, thickness reduction, and weight reduction, it is proposed to form a protective layer on at least one surface of a polarizer from a water-soluble, film-forming composition (polyvinyl alcohol-based resin composition) (Patent Document 3).

PRIOR ART DOCUMENTS

Patent Documents

Patent Document 1: JP-A-2010-009027
Patent Document 2: JP-A-2013-160775
Patent Document 3: JP-A-2005-043858

SUMMARY OF THE INVENTION

Problems to be Solved by the Invention

According to Patent Documents 1 to 3, the protective layer can somewhat suppress the shrinkage of the polarizer in its absorption axis direction and thus suppress the occurrence of cracks. For forming the protective layer, for example, a layer-forming material containing a polyvinyl alcohol-based resin is preferable in terms of adhesion to a polarizer, coating stability, productivity, and the like. However, the protective layer containing the polyvinyl alcohol-based resin had a problem that the degradation rate in the optical characteristics was large in the heating and humidifying test. In addition, suppression of crack occurrence by the protective layer was better as the thickness of the protective layer became larger, but as the thickness of the protective layer became larger, the degradation rate in the optical characteristics became larger in the heating and humidifying test.

In addition, polarizers have also been reduced in thickness. When a thinner polarizer is used to form a polarizing film, the polarizer will undergo smaller changes in shrinkage stress. However, when the polarizer itself is reduced in thickness, the polarizer can be cracked even by a force weaker than usual. Therefore, sufficient crack resistance cannot be achieved even by a thin polarizer.

An object of the present invention is to provide a polarizing film which has a transparent resin layer on at least one side of a polarizer and has crack-resistant properties, and can minimize degradation of the optical characteristics in a heating and humidifying test. Another object of the present invention is to provide a pressure-sensitive-adhesive-layer-attached polarizing film using the polarizing film. It is a further object of the present invention to provide an image display device having the polarizing film or the pressure-sensitive-adhesive-layer-attached polarizing film, and also to provide a continuous production method thereof.

Means for Solving the Problems

As a result of intensive studies, the inventors have accomplished the invention based on findings that the problems can be solved by the polarizing film, and other means described below.

That is, the present invention relates to a polarizing film having a transparent resin layer on at least one side of a polarizer containing a polyvinyl alcohol-based resin, wherein the transparent resin layer has a thickness of 0.2 μm or more and is formed from a layer-forming material containing a polyvinyl alcohol-based resin having a saponification degree of 96 mol % or more, and wherein the combined total content of sodium acetate and potassium acetate contained in the transparent resin layer is less than 1 wt %.

In the polarizing film, the combined total content of sodium acetate and potassium acetate contained in the transparent resin layer preferably is 0.5 wt % or less. Further, the combined total content preferably is 0.3 wt % or less.

In the polarizing film, the polyvinyl alcohol-based resin in the transparent resin layer preferably has a saponification degree of 99 mol % or more. Further, the polyvinyl alcohol-based resin preferably has a saponification degree of 99.3 mol % or more.

In the polarizing film, the polyvinyl alcohol-based resin in the transparent resin layer preferably has an average polymerization degree of 2000 or more.

In the polarizing film, the transparent resin layer preferably has a thickness of 0.4 μm or more. Further, the transparent resin layer preferably has a thickness of 6 μm or less.

In the polarizing film, the polarizer preferably has a thickness of 15 μm or less.

In the polarizing film, the polarizer preferably contains boric acid in an amount of 20 wt % or less based on the total amount of the polarizer.

In the polarizing film, the polarizer preferably is designed to have a single-body transmittance T and a polarization degree P representing optical properties satisfying the condition of the following formula: $P > -(10^{0.929T-42.4}-1) \times 100$ (provided that $T<42.3$) or $P \geq 99.9$ (provided that $T \geq 42.3$).

The polarizing film may have further a protective film.

Further, the present invention relates to a pressure-sensitive-adhesive-layer-attached polarizing film having the polarizing film and a pressure-sensitive adhesive layer.

In the pressure-sensitive-adhesive-layer-attached polarizing film, a separator can be laminated on the pressure-sensitive adhesive layer. The pressure-sensitive-adhesive-layer-attached polarizing film provided with the separator can be used as the form of a roll.

Further, the present invention relates to an image display device having the polarizing film or the pressure-sensitive-adhesive-layer-attached polarizing film.

Further, the present invention relates to a method for continuously producing an image display device, the method comprising the steps of:

unwinding the pressure-sensitive-adhesive-layer-attached polarizing film from the roll of the pressure-sensitive-adhesive-layer-attached polarizing film;

feeding the pressure-sensitive-adhesive-layer-attached polarizing film with the separator; and continuously bonding the pressure-sensitive-adhesive-layer-attached polarizing film to a surface of an image display panel with the pressure-sensitive adhesive layer interposed therebetween.

EFFECT OF THE INVENTION

According to the polarizing film of the present invention, such a film can suppress the occurrence of cracks by providing the transparent resin layer on a polarizer containing a polyvinyl alcohol-based resin.

The transparent resin layer in the polarizing film of the present invention contains a polyvinyl alcohol-based resin. The polyvinyl alcohol resin can be obtained by subjecting polyvinyl acetate to a saponification step with sodium hydroxide (or potassium hydroxide), but sodium acetate (or potassium acetate) is generated as an impurity in the saponification step. It was found that as the content of sodium acetate (or potassium acetate) in the transparent resin layer increases, the degree of crystallization of the polyvinyl alcohol-based resin in the transparent resin layer decreases or the crystallization speed decreases. Even if the degree of crystallization is increased by using a polyvinyl alcohol resin having a high degree of saponification as a countermeasure, the amount of crystals remained small or the crystallization rate remained slow when the content of sodium acetate (or potassium acetate) was high. In addition, in the heating and humidifying test, components of boric acid and iodine in the polarizer ooze out to a layer adjacent to the polarizer to degrade the properties of the polarizer, but when the crystal amount of the transparent resin layer is small, it was found that the optical reliability degrades by increasing the oozing amount of the component from the polarizer. It was also found that the sodium acetate (or potassium acetate) increases the water absorption of the transparent resin layer and easily contains moisture. From these results, by providing a transparent resin layer containing the polyvinyl alcohol-based resin, it was found that the moisture-heat resistance and water resistance were deteriorated to cause the degradation of the optical reliability.

In the present invention, it is possible to minimize degradation of the optical characteristics in the heating and humidifying test by using a polyvinyl alcohol-based resin having a high saponification degree of 96 mol % or more in the transparent resin layer and controlling the combined total content of sodium acetate and potassium acetate in the transparent resin layer to be less than 1 wt %. Thus, by the combination of the polyvinyl alcohol-based resin having a high saponification degree and the low content of impurities (sodium acetate and potassium acetate) to promote the crystallization of the polyvinyl alcohol resin and suppress the migration of the polarizer component, it is thought that the optical reliability related to the moisture-heat resistance and the water resistance of the transparent resin layer can be maintained. Therefore, even if the combined total content of sodium acetate and potassium acetate in the transparent resin layer is controlled to be less than 1 wt %, the optical reliability cannot be satisfied when the saponification degree of the polyvinyl alcohol-based resin is less than 96 mol %. Conversely, even if the saponification degree of the polyvinyl alcohol-based resin in the transparent resin layer is 96 mol % or more, the optical reliability cannot be satisfied when the combined total content of sodium acetate and potassium acetate in the transparent resin layer is 1 wt % or more. According to the polarizing film of the present invention, its optical reliability related to moisture-heat resistance and water resistance is good. It is thought that the degradation of the optical characteristics could be minimized in the heating and humidifying test, even when the film thickness of the transparent resin layer was increased to improve the crack resistance.

Further, the polarizing film of the present invention is suitable for use with a thin polarizer (for example, when the thickness is 15 μm or less). In a thin polarizer, the change in the shrinkage stress of the polarizer becomes smaller, but the crack resistance was not sufficient because the polarizer itself was thinned. According to the polarizing film of the present invention, even in the case of using a thin polarizer, crack resistance can be improved because the polarizer has a transparent resin layer.

MODE FOR CARRYING OUT THE INVENTION

Figure 1A:
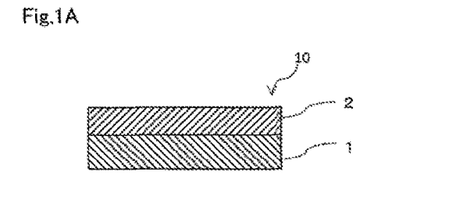
FIG. 1A and FIG. 1B are schematic cross-sectional views of examples of the polarizing film of the invention.
Figure 1B:
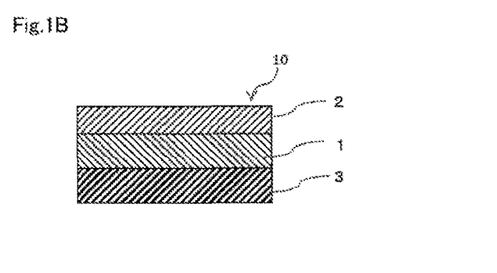

Hereinafter, the polarizing film of the invention 10 or 11 will be described with reference to FIGS. 1A, 1B, 2A, 2B, and 2C. In the polarizing films 10 and 11, a transparent resin layer 2 formed (directly) from a layer-forming material containing a polyvinyl alcohol-based resin is provided on a polarizer 1. FIG. 1A shows only the polarizer 1 and transparent resin layer 2. As shown in FIG. 1B, however, a resin substrate 3 may be provided on the polarizer 1 side of the film shown in FIG. 1A. The resin substrate 3 may be, for example, a resin substrate used in the production of the polarizer 1 of a thin type.

Figure 2A:
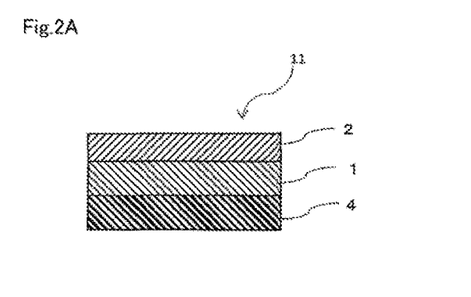
FIG. 2A, FIG. 2B and FIG. 2C are schematic cross-sectional views of examples of the polarizing film of the invention.
Figure 2B:
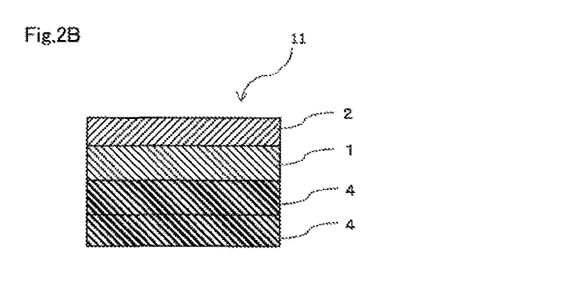
Figure 2C:
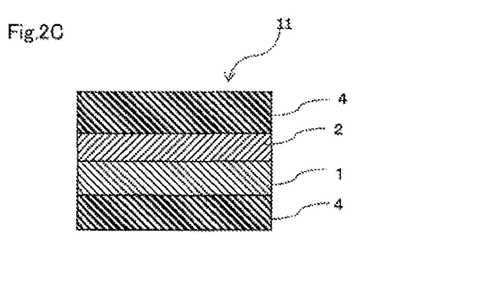

The polarizing film 11 shown in FIGS. 2A, 2B, and 2C also includes a protective film or films 4 on the polarizing film 10 of FIG. 1A. A protective film or films 4 may be provided on one or both surfaces of the polarizing film 10 of FIG. 1A. As shown in FIG. 2A, the protective film 4 may be provided only on the polarizer 1 side. Alternatively, the protective film 4 may be provided only on the transparent resin layer 2 side. FIG. 2B shows a case where protective films 4 are provided on both sides of the polarizing film 10 of FIG. 1A. A stack of two or more protective films 4 may also be used. FIG. 2C shows a case where two protective films 4 are stacked on one side of the polarizer 1. Although not shown in FIG. 2A, 2B, or 2C, an intervening layer such as an adhesive layer, a pressure-sensitive adhesive layer, or an undercoat layer (primer layer) is provided between the polarizer 1 or the transparent resin layer 2 and the protective film 4 stacked on each other. Although not shown, an adhesion facilitating layer or an activation treatment may be formed or performed on the protective film 4, and the adhesion facilitating layer and an adhesive layer may be stacked on each other.

Although not shown, a pressure-sensitive adhesive layer may also be provided on the polarizing film 10 or 11 of the invention. A separator may be further provided on the pressure-sensitive adhesive layer. In addition, a surface protective film may be provided on the polarizing film 10 or 11 of the invention (particularly in the case where the protective film 4 is provided). The pressure-sensitive-adhesive-layer-attached polarizing film having at least the separator (furthermore, having a surface protective film) can be used as the form of a roll, and for example, it is possible to continuously produce the image display device by applying a pressure-sensitive-adhesive-layer-attached polarizing film delivered from the form of a roll and conveyed by the separator to a method of bonding the polarizing film to the surface of an image display panel via a pressure-sensitive adhesive layer (also referred to as "roll-to-panel method, typically, see Japanese Patent No. 4406043 specification).

<Polarizer>

The polarizer used includes a polyvinyl alcohol-based resin. For example, the polarizer may be a product produced by a process including adsorbing a dichroic material such as iodine or a dichroic dye to a hydrophilic polymer film such as a polyvinyl alcohol-based film, a partially-formalized polyvinyl alcohol-based film, or a partially-saponified, ethylene-vinyl acetate copolymer-based film and uniaxially stretching the film, or may be a polyene-based oriented film such as a film of a dehydration product of polyvinyl alcohol or a dehydrochlorination product of polyvinyl chloride.

Among these polarizers, a polarizer including a polyvinyl alcohol-based film and a dichroic material such as iodine is preferred. The thickness of these polarizers is not particularly limited, but is generally 2 to 25 µm.

For example, a polarizer including a uniaxially-stretched polyvinyl alcohol-based film dyed with iodine can be produced by a process including immersing a polyvinyl alcohol film in an aqueous iodine solution to dye the film and stretching the film to 3 to 7 times the original length. If necessary, the film may also be immersed in an aqueous solution of potassium iodide or the like optionally containing boric acid, zinc sulfate, zinc chloride, or other materials. If necessary, the polyvinyl alcohol-based film may be further immersed in water for washing before it is dyed. If the polyvinyl alcohol-based film is washed with water, dirt and any anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after it is dyed with iodine. The film may also be stretched in an aqueous solution of boric acid, potassium iodide, or the like or in a water bath.

The polarizer used can be a thin polarizer with a thickness of 15 µm or less. In view of thickness reduction and resistance to thermal shock-induced cracks, the polarizer preferably has a thickness of 12 µm or less, more preferably 10 µm or less, even more preferably 8 µm or less, further more preferably 7 µm or less, still more preferably 6 µm or less. On the other hand, the polarizer preferably has a thickness of 2 µm or more, more preferably 3 µm or more. The polarizer with such a small thickness is less uneven in thickness, has good visibility, and is less dimensionally-variable and thus has high durability to thermal shock.

In view of stretching stability and optical durability, the polarizer can contain boric acid. In order to suppress the occurrence of cracks such as through cracks and the like in the present invention, the content of boric acid in the polarizer is preferably 20% by weight or less, more preferably 18% by weight or less, even more preferably 16% by weight or less, based on the total weight of the polarizer. If the content of boric acid in the polarizer is more than 20% by weight, shrinkage stress in the polarizer can increase to make through cracks more likely to occur even when the thickness of the polarizer is controlled to 15 µm or less, which is not preferred. On the other hand, in view of the stretching stability and optical durability of the polarizer, the boron content is preferably 10% by weight or more, more preferably 12% by weight or more, based on the total weight of the polarizer.

Typical examples of the thin polarizer with a thickness of 15 µm or less include the thin polarizing films (polarizers) described in, for example, JP-B1-4751486, JP-B1-4751481, JP-B1-4815544, JP-B1-5048120, JP-B1-5587517, WO 2014/077599 A, and WO 2014/077636 A or thin polarizing films (polarizers) obtained by the production methods described in these publications.

The polarizer is preferably designed to have a single-body transmittance T and a polarization degree P that represent optical properties satisfying the condition of the following formula: $P > -(10^{0.929T-42.4}-1) \times 100$ (provided that $T < 42.3$) or $P \geq 99.9$ (provided that $T \geq 42.3$). The polarizing film designed to satisfy the condition uniquely has the performance required for a liquid crystal television display having a large display element. Specifically, such a display is required to have a contrast ratio of 1,000:1 or more and a maximum brightness of 500 cd/m$^2$ or more. In other applications, for example, the polarizer is bonded to the viewer side of an organic EL display device.

The thin polarizing film described above should be produced by a process capable of achieving high-ratio stretching to improve polarizing performance, among processes including the steps of stretching and dyeing a laminate. From this point of view, the thin polarizing film is preferably obtained by a process including the step of stretching in an aqueous boric acid solution as described in JP-B1-4751486, JP-B1-4751481, or JP-B1-4815544, and more preferably obtained by a process including the step of performing auxiliary in-air stretching before stretching in an aqueous boric acid solution as described in JP-B1-4751481 or JP-B1-4815544. These thin polarizing films can be obtained by a process including the steps of stretching a laminate of a polyvinyl alcohol-based resin (hereinafter also referred to as PVA-based resin) layer and a stretchable resin substrate and dyeing the laminate. Using this process, the PVA-based resin layer, even when thin, can be stretched without problems such as breakage by stretching, because the layer is supported on the stretchable resin substrate.

<Resin Substrate>

The resin substrate shown in FIG. 1B (the resin substrate for stretching) maybe the substrate used in the production of the thin polarizer. The material used to form the resin substrate maybe any of various thermoplastic resins. Examples of thermoplastic resins include ester-based resins such as polyethylene terephthalate-based resins, cycloolefin-based resins such as norbornene-based resins, olefin-based resins such as polypropylene, polyamide-based resins, polycarbonate-based resins, and copolymerized resins thereof. Among them, ester-based resins are preferred in view of ease of production and reduction in costs. A thermoplastic ester-based resin substrate may be used, which may be a thermoplastic amorphous ester-based resin substrate or a thermoplastic crystalline ester-based resin substrate.

<Protective Film>

The protective film is preferably made of a material having a high level of transparency, mechanical strength, thermal stability, water barrier properties, isotropy, and other properties. Examples of such a material include polyester-based polymers such as polyethylene terephthalate and polyethylene naphthalate, cellulose-based polymers such as diacetyl cellulose and triacetyl cellulose, acrylic-based polymers such as polymethyl methacrylate, styrene-based polymers such as polystyrene and acrylonitrile-styrene copolymers (AS resins), and polycarbonate-based polymers. Examples of polymers that may be used to form the transparent protective film also include polyolefin-based polymers such as polyethylene, polypropylene, cyclo-based or norbornene-structure-containing polyolefin, and ethylene-propylene copolymers, vinyl chloride-based polymers, amide-based polymers such as nylon and aromatic polyamide, imide-based polymers, sulfone-based polymers, polyether sulfone-based polymers, polyether ether ketone-based polymers, polyphenylene sulfide-based polymers, vinyl alcohol-based polymers, vinylidene chloride-based polymers, vinyl butyral-based polymers, arylate-based polymers, polyoxymethylene-based polymers, epoxy-based polymers, or any blends of the above polymers.

The protective film may also contain any type of one or more appropriate additives. Examples of such additives include ultraviolet absorbers, antioxidants, lubricants, plasticizers, release agents, discoloration preventing agents, flame retardants, nucleating agents, antistatic agents, pigments, and colorants. The content of the thermoplastic resin in the protective film is preferably from 50 to 100% by weight, more preferably from 50 to 99% by weight, even more preferably from 60 to 98% by weight, further more preferably from 70 to 97% by weight. If the content of the thermoplastic resin in the protective film is 50% by weight or less, high transparency and other properties inherent in the thermoplastic resin may fail to be sufficiently exhibited.

The protective film may also be, for example, a retardation film, a brightness enhancement film, or a diffusion film. The retardation film may have an in-plane retardation of 40 nm or more and/or a thickness direction retardation of 80 nm or more. The in-plane retardation is generally adjusted to fall within the range of 40 to 200 nm, and the thickness direction retardation is generally adjusted to fall within the range of 80 to 300 nm. When a retardation film is used as the protective film, the retardation film can also serve as a polarizer protecting film, which contributes to thickness reduction.

The retardation film may be a birefringent film formed by subjecting a thermoplastic resin film to uniaxial or biaxial stretching. The stretching temperature, the stretch ratio, and other conditions may be appropriately selected depending on the retardation value, the film material, and the thickness.

The thickness of the protective film may be selected as needed. In general, the thickness of the transparent protective film is from about 1 to about 500 µm in view of strength, workability such as handleability, and thin layer formability. In particular, the thickness of the transparent protective film is preferably from 1 to 300 µm, more preferably from 5 to 200 µm, even more preferably from 5 to 150 µm, further more preferably from 20 to 100 µm for thickness reduction.

The surface of the protective film, opposite to its surface where the polarizer is bonded (particularly in the mode shown in FIG. 1), may be provided with a functional layer such as a hard coat layer, an anti-reflection layer, an anti-sticking layer, a diffusion layer, or an antiglare layer. The functional layer such as a hard coat layer, an anti-reflection layer, an anti-sticking layer, a diffusion layer, or an antiglare layer may be provided as part of the protective film itself or as a layer independent of the protective film.

<Intervening Layer>

The protective film and the polarizer are laminated with an intervening layer, such as an adhesive layer, a pressure-sensitive adhesive layer, or an undercoat layer (primer layer), between them. In this case, the intervening layer should preferably be used to laminate them with no air gap between them.

The adhesive layer is made from an adhesive. Any of various types of adhesives maybe used. The adhesive layer may be of any optically-transparent type. The adhesive may be any of various types, such as a water-based adhesive, a solvent-based adhesive, a hot melt-based adhesive, and an active energy ray-curable adhesive. A water-based adhesive or an active energy ray-curable adhesive is preferred.

The water-based adhesive may be, for example, an isocyanate-based adhesive, a polyvinyl alcohol-based adhesive, agelatin-based adhesive, a vinyl-based adhesive, a latex-based adhesive, or a water-based polyester adhesive. The water-based adhesive is generally used in the form of an aqueous solution, which generally has a solids content of 0.5 to 60% by weight.

The active energy ray-curable adhesive is an adhesive capable of being cured by exposure to active energy rays such as electron beams or ultraviolet rays (a radically or cationically curable adhesive). The active energy ray-curable adhesive to be used may be of, for example, an electron beam-curable type or an ultraviolet-curable type. The active energy ray-curable adhesive may be, for example, a photo-radically curable adhesive. The photo-radically curable type active energy ray-curable adhesive may be of an ultraviolet-curable type. In this case, the adhesive should contain a radically polymerizable compound and a photopolymerization initiator.

The method for applying the adhesive is appropriately selected depending on the viscosity of the adhesive and the desired thickness. Examples of application means include a reverse coater, a gravure coater (direct, reverse, or offset), a bar reverse coater, a roll coater, a die coater, a bar coater, and a rod coater. Any other suitable application method such as dipping may also be used.

For example, when the water-based adhesive is used, the adhesive is preferably applied in such a manner that the finally formed adhesive layer can have a thickness of 30 to 300 nm. The adhesive layer more preferably has a thickness of 60 to 250 nm. On the other hand, when the active energy ray-curable adhesive is used, the adhesive layer is preferably formed with a thickness of 0.1 to 200 µm. The thickness is more preferably from 0.5 to 50 µm, even more preferably from 0.5 to 10 µm.

In the process of laminating the polarizer and the protective film, an adhesion-facilitating layer may be placed between the protective film and the adhesive layer. The adhesion-facilitating layer may be made of, for example, any of various resins having a polyester skeleton, a polyether skeleton, a polycarbonate skeleton, a polyurethane skeleton, a silicone skeleton, a polyamide skeleton, a polyimide skeleton, a polyvinyl alcohol skeleton, or other polymer skeletons. These polymer resins may be used singly or in combination of two or more. Other additives may also be added to form the adhesion-facilitating layer. More specifically, a tackifier, an ultraviolet absorber, an antioxidant, or a stabilizer such as a heat-resistant stabilizer may also be used to form the adhesion-facilitating layer.

The adhesion-facilitating layer is usually provided in advance on the protective film, and then the adhesion-facilitating layer side of the protective film is bonded to the polarizer with the adhesive layer. The adhesion-facilitating layer can be formed using a known technique that includes applying an adhesion-facilitating-layer-forming material onto the protective film and drying the material. The adhesion-facilitating-layer-forming material is generally prepared in the form of a solution which is diluted to a suitable concentration taking into account the coating thickness after drying, the smoothness of the application, and other factors. After dried, the adhesion-facilitating layer preferably has a thickness of 0.01 to 5 µm, more preferably 0.02 to 2 µm, even more preferably 0.05 to 1 µm. Two or more adhesion-facilitating layers maybe provided. Also in this case, the total thickness of the adhesion-facilitating layers preferably falls within these ranges.

The pressure-sensitive adhesive layer is made from a pressure-sensitive adhesive. Any of various pressure-sensitive adhesives may be used, examples of which include rubber-based pressure-sensitive adhesives, acryl-based pressure-sensitive adhesives, silicone-based pressure-sensitive adhesives, polyurethane-based pressure-sensitive adhesives, vinyl alkyl ether-based pressure-sensitive adhesives, polyvinylpyrrolidone-based pressure-sensitive adhesives, polyacrylamide-based pressure-sensitive adhesives, and cellulose-based pressure-sensitive adhesives. The base polymer with adhesive properties is selected depending on the type of the pressure-sensitive adhesive. Among these pressure-sensitive adhesives, acryl-based pressure-sensitive adhesives are preferably used because they have a high level of optical transparency, weather resistance, heat resistance, and other properties, and exhibit an appropriate level of wettability and adhesive properties including cohesiveness and adhesiveness.

The undercoat layer (primer layer) is formed to improve the adhesion between the polarizer and the protective film. The primer layer may be made of any material capable of providing somewhat strong adhesion to both the base film and a polyvinyl alcohol-based resin layer. For example, a thermoplastic resin having a high level of transparency, thermal stability, and stretchability may be used to form the primer layer. Such a thermoplastic resin may be, for example, an acryl-based resin, a polyolefin-based resin, a polyester-based resin, a polyvinyl alcohol-based resin, or any mixture thereof.

<Transparent Resin Layer>

The transparent resin layer may be formed from a layer-forming material containing a polyvinyl alcohol-based resin. The polyvinyl alcohol-based resin used to form the transparent resin layer may be the same as or different from the polyvinyl alcohol-based resin in the polarizer as long as it falls under the category of "polyvinyl alcohol-based resin."

The transparent resin layer can be formed, for example, by applying the layer-forming material to a polarizer. The transparent resin layer is provided on at least one side of the polarizer. The thickness of the transparent resin layer is 0.2 µm or more, and occurrence of cracks can be suppressed by the transparent resin layer having such a thickness. The thickness of the transparent resin layer is preferably 0.4 µm or more, more preferably 0.5 µm or more, even more preferably 0.7 µm or more. On the other hand, when the transparent resin layer is too thick, the optical reliability and water resistance are lowered. Thus, the thickness of the transparent resin layer is preferably 6 µm or less, more preferably 5 µm or less, even more preferably 3 µm or less.

The combined total content of sodium acetate and potassium acetate contained in the transparent resin layer of the present invention is controlled to be less than 1 wt % from the viewpoint of optical reliability in the heating and humidifying test. The combined total content of sodium acetate and potassium acetate is preferably 0.5 wt % or less, more preferably 0.3 wt % or less, even more preferably 0.05 wt % or less. The combined total content of sodium acetate and potassium acetate can be controlled by using, as a layer-forming material used for forming the transparent resin layer, a polyvinyl alcohol-based resin having a small ratio of the combined total content of sodium acetate and potassium acetate, such as a polyvinyl alcohol-based resin composition in which the ratio of the combined total content of sodium acetate and potassium acetate is less than 1 wt %.

The polyvinyl alcohol-based resin may be, for example, polyvinyl alcohol. Polyvinyl alcohol can be obtained by saponifying polyvinyl acetate. The polyvinyl alcohol-based resin may also be a product produced by saponifying a copolymer of vinyl acetate and any other monomer or monomers copolymerizable therewith. In this case, when the copolymerizable monomer is ethylene, an ethylene-vinyl alcohol copolymer can be obtained. Examples of the copolymerizable monomer include unsaturated carboxylic acids such as maleic acid (anhydride), fumaric acid, crotonic acid, itaconic acid, and (meth)acrylic acid, and esters thereof; α-olefins such as ethylene and propylene; (sodium) (meth)allylsulfonate, sodium sulfonate (monoalkyl maleate), sodium disulfonate alkyl maleate, N-methylolacrylamide, acrylamide alkyl sulfonate alkali salts, N-vinylpyrrolidone, and N-vinylpyrrolidone derivatives. These polyvinyl alcohol-based resins maybe used alone or in combination of two or more. From the viewpoint of satisfying moist-heat resistance and water resistance, a polyvinyl alcohol obtained by saponifying a polyvinyl acetate is preferred.

The polyvinyl alcohol-based resin to be used may have a saponification degree of, for example, 96% by mole or more. In view of the transparent resin layer can have a satisfactory level of moist-heat resistance or water resistance, the polyvinyl alcohol-based resin preferably has a saponification degree of 99% by mole or more, more preferably 99.3% by mole or more, even more preferably 99.7% by mole or more. The saponification degree indicates the proportion of the units actually saponified to vinyl alcohol units in the units capable of being converted to vinyl alcohol units by saponification, after which vinyl ester units can remain as residues. The saponification degree can be determined according to JIS K 6726-1994.

The polyvinyl alcohol-based resin to be used may have an average degree of polymerization of, for example, 500 or more. In view of the transparent resin layer can have a satisfactory level of moist-heat resistance or water resistance, the polyvinyl alcohol-based resin preferably has an average degree of polymerization of 1,000 or more, more preferably 1,500 or more, even more preferably 2,000 or more. The average degree of polymerization of the polyvinyl alcohol-based resin can be measured according to JIS K 6726.

The polyvinyl alcohol-based resin to be used may also be a modified polyvinyl alcohol-based resin having a hydrophilic functional group on the side chain of the polyvinyl alcohol or copolymerized polyvinyl alcohol. The hydrophilic functional group may be, for example, an acetoacetyl group or a carbonyl group. Other examples of the polyvinyl alcohol resin that may be used include modified polyvinyl alcohols obtained by, for example, acetalization, urethanation, etherification, or phosphorylation of polyvinyl alcohol resin or grafting on polyvinyl alcohol resin.

As described above, the transparent resin layer of the present invention is controlled such that the combined total content of sodium acetate and potassium acetate is less than 1 wt %. The control can be carried out, for example, by washing sodium acetate and potassium acetate from the polyvinyl alcohol-based resin that forms a transparent resin layer as described below.

<Washing Method of Sodium Acetate and Potassium Acetate>

The polyvinyl alcohol resin is produced by polymerizing a vinyl acetate monomer and saponifying the resulting polyvinyl acetate, and sodium acetate (or potassium acetate) is contained in its production process. As a method for washing sodium acetate (or potassium acetate) in the polyvinyl alcohol resin, a known method can be used. For example, it is possible to adopt a method described in JP-A-2002-301715, JP-A-2002-60495, JP-A-2007-245432, WO 2011/108152, and the like. Although sodium acetate (or potassium acetate) may be washed by any means in the washing method, it is preferable to carry out the washing process repeatedly multiple times until the sodium acetate (or potassium acetate) reaches the target content in order to obtain the effect of the present invention.

The transparent resin layer may be formed from a layer-forming material not containing a curable component. For example, the transparent resin layer may be formed from a layer-forming material containing the polyvinyl alcohol-based resin (PVA-based resin) as a main component.

The layer-forming material containing the polyvinyl alcohol-based resin as a main component may contain a curable component (crosslinking agent). The content of the polyvinyl alcohol-based resin in the transparent resin layer or the layer-forming material (solid basis) is preferably 80% by weight or more, more preferably 90% by weight or more, even more preferably 95% by weight or more. But the layer-forming material is preferably free of any curable component (crosslinking agent).

A compound having at least two functional groups reactive with the polyvinyl alcohol-based resin may be used as the crosslinking agent. Examples of such a compound include alkylenediamines having an alkylene group and two amino groups, such as ethylenediamine, triethylenediamine, and hexamethylenediamine; isocyanates such as tolylene diisocyanate, hydrogenated tolylene diisocyanate, trimethylolpropane tolylene diisocyanate adducts, triphenylmethane triisocyanate, methylene bis(4-phenylmethanetriisocyanate, isophorone diisocyanate, and ketoxime blocked compounds thereof or phenol blocked compounds thereof; epoxies such as ethylene glycol diglycidyl ether, polyethylene glycol diglycidyl ether, glycerin di- or triglycidyl ether, 1,6-hexanediol diglycidyl ether, trimethylolpropane triglycidyl ether, diglycidyl aniline, and diglycidyl amine; monoaldehydes such as formaldehyde, acetaldehyde, propionaldehyde, and butylaldehyde; dialdehydes such as glyoxal, malondialdehyde, succindialdehyde, glutardialdehyde, maleic dialdehyde, and phthaldialdehyde; amino-formaldehyde resins such as condensates of formaldehyde with methylolurea, methylolmelamine, alkylated methylolurea, alkylated methylolmelamine, acetoguanamine, or benzoguanamine; dicarboxylic acid dihydrazides such as adipic acid dihydrazide, oxalic acid dihydrazide, malonic acid dihydrazide, succinic acid dihydrazide, glutaric acid dihydrazide, isophthalic acid dihydrazide, sebacic acid dihydrazide, maleic acid dihydrazide, fumaric acid dihydrazide, and itaconic acid dihydrazide; water-soluble dihydrazines such as ethylene-1,2-dihydrazine, propylene-1,3-dihydrazine, and butylene-1,4-dihydrazine; and salts and oxides of sodium, potassium, magnesium, calcium, aluminum, iron, nickel, and other bivalent or trivalent metals. Among them, amino-formaldehyde resins and water-soluble dihydrazines are preferred. The amino-formaldehyde resins are preferably methylol group-containing compounds. Methylolmelamine is particularly preferred among the methylol group-containing compounds.

The curable component (crosslinking agent) may be used to improve water resistance, in which the content of the curable component (crosslinking agent) is preferably 20 parts by weight or less, 10 parts by weight or less, or 5 parts by weight or less, based on 100 parts by weight of the polyvinyl alcohol-based resin.

The layer-forming material may be prepared as a solution by dissolving the polyvinyl alcohol-based resin in a solvent. Examples of the solvent include water, dimethyl sulfoxide, dimethylformamide, dimethylacetamide, N-methylpyrrolidone, various glycols, polyhydric alcohols including trimethylolpropane, and amines such as ethylenediamine and diethylenetriamine. These solvents may be used alone or in combination of two or more. Among them, water is preferably used as the solvent to form the layer-forming material as an aqueous solution. The concentration of the polyvinyl alcohol-based resin in the layer-forming material (e.g., an aqueous solution) maybe, but not limited to, 0.1 to 15% by weight, preferably 0.5 to 10% by weight, in view of coatability, shelf stability, and other properties.

An additive may also be added as appropriate to the layer-forming material (e.g., aqueous solution). Examples of the additive include a plasticizer, a surfactant or the like. The plasticizer may be, for example, a polyhydric alcohol such as ethylene glycol or glycerin. The surfactant may be, for example, a nonionic surfactant. The layer-forming material may also contain a coupling agent such as a silane coupling agent or a titanium coupling agent, any of various tackifiers, an ultraviolet absorber, an antioxidant, and a stabilizer such as a heat-resistant stabilizer or a hydrolysis-resistant stabilizer.

The transparent resin layer may be formed by applying the layer-forming material to the other surface of the polarizer (the surface opposite to its surface on which the protective film is provided) and drying the material. The layer-forming material is applied in such a manner that a 0.2 µm or more thick coating can be formed after drying. The application process is not limited, and any appropriate method may be used in the application process. For example, roll coating, spin coating, wire bar coating, dip coating, die coating, curtain coating, spray coating, knife coating, (such as comma coating), or various other methods may be used. In general, the drying temperature of the applied layer-forming material is preferably from 60 to 120° C., more preferably from 70 to 100° C. The drying time is preferably from 10 to 300 seconds, more preferably from 20 to 120 seconds.

<Pressure-sensitive Adhesive Layer>

A pressure-sensitive adhesive layer may be provided on the polarizing film to form a pressure-sensitive-adhesive-layer-attached polarizing film for use. The pressure-sensitive adhesive layer maybe provided on the transparent resin layer or polarizer side of the polarizing film. When the polarizing film has a protective film, the pressure-sensitive adhesive layer may be provided on the protective film. A separator may be provided on the pressure-sensitive adhesive layer of the pressure-sensitive-adhesive-layer-attached polarizing film.

The pressure-sensitive adhesive layer may be formed using any appropriate type of pressure-sensitive adhesive. Examples of the pressure-sensitive adhesive include a rubber-based pressure-sensitive adhesive, an acryl-based pressure-sensitive adhesive, a silicone-based pressure-sensitive adhesive, a urethane-based pressure-sensitive adhesive, a vinyl alkyl ether-based pressure-sensitive adhesive, a polyvinyl alcohol-based pressure-sensitive adhesive, a polyvinylpyrrolidone-based pressure-sensitive adhesive, a polyacrylamide-based pressure-sensitive adhesive, and a cellulose-based pressure-sensitive adhesive.

Among these pressure-sensitive adhesives, those having a high level of optical transparency and weather resistance or heat resistance and exhibiting an appropriate level of wettability and adhesive properties such as cohesiveness and adhesiveness are preferably used. An acryl-based pressure-sensitive adhesive is preferably used because it has such properties.

The pressure-sensitive adhesive layer can be formed by a method including applying the pressure-sensitive adhesive to a release-treated separator or other means, removing the polymerization solvent and other components from the adhesive by drying to form a pressure-sensitive adhesive layer, and then transferring the pressure-sensitive adhesive layer onto the transparent resin layer or the protective film in the embodiment of FIG. 2A or 2B (or onto the protective film in the embodiment of FIG. 2C). Alternatively, the pressure-sensitive adhesive layer can be formed by a method including applying the pressure-sensitive adhesive to the transparent resin layer or the protective film in the embodiment of FIG. 2A or 2B (or to the protective film in the embodiment of FIG. 2C) and removing the polymerization solvent and other components from the adhesive by drying to form a pressure-sensitive adhesive layer on the polarizer.

In the process of applying the pressure-sensitive adhesive, if necessary, one or more solvents other than the polymerization solvent may be newly added to the adhesive.

A silicone release liner is preferably used as the release-treated separator. In the invention, the pressure-sensitive adhesive may be applied to such a liner and then dried to form a pressure-sensitive adhesive layer. In this process, any appropriate method may be used for drying the pressure-sensitive adhesive, depending on purpose. Preferably, a method of heating and drying the coating film is used. The heating and drying temperature is preferably from 40° C. to 200° C., more preferably from 50° C. to 180° C., even more preferably from 70° C. to 170° C. When the heating temperature is set in the range, a pressure-sensitive adhesive with a high level of adhesive properties can be obtained.

Any appropriate drying time may be used as needed. The drying time is preferably from 5 seconds to 20 minutes, more preferably from 5 seconds to 10 minutes, even more preferably from 10 seconds to 5 minutes.

Various methods may be used to form the pressure-sensitive adhesive layer. Examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or other means.

The thickness of the pressure-sensitive adhesive layer is typically, but not limited to, about 1 to about 100 µm, preferably 2 to 50 µm, more preferably 2 to 40 µm, even more preferably 5 to 35 µm.

When the pressure-sensitive adhesive layer is exposed, the pressure-sensitive adhesive layer may be protected by a release-treated sheet (separator) until it is actually used.

Examples of the material used to form such a separator include a plastic film such as a polyethylene, polypropylene, polyethylene terephthalate, or polyester film, a paper, a cloth, a porous material such as nonwoven fabric, and appropriate thin materials such as a net, a foamed sheet, a metal foil, and any laminate thereof. A plastic film is preferably used because of its good surface smoothness.

Such a plastic film may be of any type capable of protecting the pressure-sensitive adhesive layer. Such a plastic film may be, for example, a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, or an ethylene-vinyl acetate copolymer film.

The separator generally has a thickness of about 5 to about 200 µm, preferably about 5 to about 100 µm. If necessary, the separator may be subjected to a release treatment and an anti-pollution treatment with a silicone-based, fluoride-based, long-chain alkyl-based, or fatty acid amide-based release agent, a silica powder, or other materials, or subjected to an antistatic treatment of coating type, kneading and mixing type, vapor-deposition type, or other types. In particular, when the surface of the separator is appropriately subjected to a release treatment such as a silicone treatment, a long-chain alkyl treatment, or a fluorine treatment, the releasability from the pressure-sensitive adhesive layer can be further improved.

<Surface Protective Film>

A surface protective film may be provided on the polarizing film. The surface protective film generally has a base film and a pressure-sensitive adhesive layer. The surface protective film protects the polarizer with the pressure-sensitive adhesive layer interposed between them.

In view of the ability to be tested or managed, an isotropic or nearly-isotropic film material should be selected as the base film for the surface protective film. Examples of such a film material include polyester-based resins such as polyethylene terephthalate films, cellulose-based resins, acetate-based resins, polyethersulfone-based resins, polycarbonate-based resins, polyamide-based resins, polyimide-based resins, polyolefin-based resins, acryl-based resins, and other transparent polymers. In particular, polyester-based resins are preferred. The base film may be made of a single film material or a laminate of two or more film materials. The base film may also be a product obtained by stretching the film. The base film generally has a thickness of 500 µm or less, preferably 10 to 200 µm.

The pressure-sensitive adhesive used to form the pressure-sensitive adhesive layer for the surface protective film may be appropriately selected from pressure-sensitive adhesives including, as a base polymer, a (meth)acryl-based polymer, a silicone-based polymer, polyester, polyurethane, polyamide, polyether, fluoride-based polymer, rubber-based polymer, or any other polymer. An acryl-based pressure-sensitive adhesive containing an acryl-based polymer as a base polymer is preferred in view of transparency, weather resistance, heat resistance, and other properties. The thickness (dry thickness) of the pressure-sensitive adhesive layer is selected depending on the desired adhesive strength. The thickness of the pressure-sensitive adhesive is generally from about 1 to about 100 µm, preferably from 5 to 50 µm.

A silicone, long-chain alkyl, or fluorine treatment with a low-adhesion material may also be performed to form a release treatment layer on the surface of the base film of the surface protective film, opposite to its surface on which the pressure-sensitive adhesive layer is provided.

<Other Optical Layers>

For practical use, the polarizing film of the invention maybe laminated with any other optical layer or layers to form an optical film. As a non-limiting example, such an optical layer or layers maybe one or more optical layers that have ever been used to form liquid crystal display devices or other devices, such as a reflector, a transflector, a retardation plate (including a wavelength plate such as a half or quarter wavelength plate), or a viewing angle compensation film. Particularly preferred is a reflective or transflective polarizing film including a laminate of the polarizing film of the invention and a reflector or a transflector, an elliptically or circularly polarizing film including a laminate of the polarizing film of the invention and a retardation plate, a wide viewing angle polarizing film including a laminate of the polarizing film of the invention and a viewing angle compensation film, or a polarizing film including a laminate of the polarizing film of the invention and a brightness enhancement film.

The optical film including a laminate of the above optical layer and the polarizing film may be formed by a method of stacking them one by one, for example, in the process of manufacturing a liquid crystal display device. However, the optical film should be formed by stacking them in advance, which is superior in quality stability or assembling workability and thus advantageous in facilitating the process of manufacturing liquid crystal display devices or other devices. In the lamination, any appropriate bonding means such as a pressure-sensitive adhesive layer may be used. When the polarizing film and any other optical film are bonded together, their optical axes may be each aligned at an appropriate angle, depending on the desired retardation properties or other desired properties.

The polarizing film or the optical film according to the invention is preferably used to form various devices such as liquid crystal display devices or the like. Liquid crystal display devices may be formed according to conventional techniques. Specifically, a liquid crystal display device may be typically formed according to any conventional techniques by appropriately assembling a liquid crystal cell, polarizing films or optical films, and optional components such as a lighting system, incorporating a driving circuit, and performing other processes, except that the polarizing film or the optical film according to the invention is used. The liquid crystal cell to be used may also be of any type, such as IPS type or VA type.

Any desired liquid crystal display device may be formed, such as a liquid crystal display device including a liquid crystal cell and the polarizing film or films, or the optical film or films placed on one or both sides of the liquid crystal cell, or a liquid crystal display device further including a backlight or a reflector in the lighting system. In such a case, the polarizing film or films or the optical film or films according to the invention may be placed on one or both sides of the liquid crystal cell. When the polarizing films or the optical films are provided on both sides, they may be the same or different. The process of forming the liquid crystal display device may also include placing, at an appropriate position or positions, one or more layers of an appropriate component such as a diffusion plate, an antiglare layer, an anti-reflection film, a protective plate, a prism array, a lens array sheet, a light diffusion plate, or a backlight.

EXAMPLES

Hereinafter, the invention will be more specifically described with reference to examples. It will be understood that the examples shown below are not intended to limit the invention. In each example, "parts" and "%" are all by weight. Unless otherwise specified below, the conditions of standing at room temperature include 23° C. and 65% RH in all cases.

<Preparation of Optical Film Laminate A0>

A corona treatment was performed on one surface of an amorphous isophthalic acid-copolymerized polyethylene terephthalate (IPA-copolymerized PET) film substrate (100 µm in thickness) with a water absorption of 0.75% and a Tg of 75° C. An aqueous solution containing polyvinyl alcohol (4,200 in polymerization degree, 99.2% by mole in saponification degree) and acetoacetyl-modified PVA (Gohsefimer Z200 (trade name) manufactured by The Nippon Synthetic Chemical Industry Co., Ltd., 1,200 in polymerization degree, 4.6% in acetoacetyl modification degree, 99.0% by mole or more in saponification degree) in a ratio of 9:1 was applied to the corona-treated surface at 25° C. and then dried to form a 11-µm-thick PVA-based resin layer, so that a laminate was formed.

In an oven at 120° C., the resulting laminate was subjected to free-end uniaxial stretching to 2.0 times in the longitudinal direction between rolls at different peripheral speeds (auxiliary in-air stretching).

Subsequently, the laminate was immersed in an insolubilization bath (an aqueous boric acid solution obtained by adding 4 parts by weight of boric acid to 100 parts by weight of water) at a temperature of 30° C. for 30 seconds (insolubilization).

Subsequently, the laminate was immersed in a dyeing bath at a temperature of 30° C. while the iodine concentration and the immersion time were so controlled as to allow the resulting polarizing plate to have a predetermined transmittance. In this example, the laminate was immersed for 60 seconds in an aqueous iodine solution obtained by adding 0.2 parts by weight of iodine and 1.0 part by weight of potassium iodide to 100 parts by weight of water (dyeing).

Subsequently, the laminate was immersed for 30 seconds in a crosslinking bath (an aqueous boric acid solution obtained by adding 3 parts by weight of potassium iodide and 3 parts by weight of boric acid to 100 parts by weight of water) at a temperature of 30° C. (crosslinking).

The laminate was then uniaxially stretched to a total stretch ratio of 5.5 times in the longitudinal direction between rolls at different peripheral speeds while it was immersed in an aqueous boric acid solution (an aqueous solution obtained by adding 4 parts by weight of boric acid and 5 parts by weight of potassium iodide to 100 parts by weight of water) at a temperature of 70° C. (in-water stretching).

The laminate was then immersed in a cleaning bath (an aqueous solution obtained by adding 4 parts by weight of potassium iodide to 100 parts by weight of water) at a temperature of 30° C. (cleaning).

The resulting product was an optical film laminate A0 including a 5-μm-thick polarizer.

<Preparation of Optical Film Laminate A1>

Optical film laminate A1 was obtained similarly to the method of preparing optical film laminate A0, except that the content of boric acid in the aqueous boric acid solution for in-water stretching was changed to 3.5 parts by weight. The resulting polarizer had a thickness of 5 μm.

<Preparation of Optical Film Laminate A2>

Optical film laminate A2 was obtained similarly to the method of preparing optical film laminate A0, except that the content of boric acid in the aqueous boric acid solution for in-water stretching was changed to 4.5 parts by weight. The resulting polarizer had a thickness of 5 μm.

<Preparation of Optical Film Laminate B>

Optical film laminate B was obtained similarly to the method of preparing optical film laminate A0, except that the PVA-based resin layer was formed with a thickness of 15 μm. The resulting polarizer had a thickness of 7 μm.

<Preparation of Polarizer C>

A 30-μm-thick polyvinyl alcohol film with an average degree of polymerization of 2,400 and a degree of saponification of 99.9% by mole was immersed in warm water at 30° C. for 60 seconds so that it was allowed to swell. Subsequently, the film was immersed in an aqueous solution of 0.3% iodine/potassium iodide (0.5/8 in weight ratio) and dyed while stretched to 3.5 times. The film was then stretched to a total stretch ratio of 6 times in an aqueous boric ester solution at 65° C. After the stretching, the film was dried in an oven at 40° C. for 3 minutes to give a PVA-based polarizer C. The resulting polarizer had a thickness of 12 μm.

<Preparation of Polarizer D>

A 75-μm-thick polyvinyl alcohol film with an average degree of polymerization of 2,400 and a degree of saponification of 99.9% by mole was immersed in warm water at 30° C. for 60 seconds so that it was allowed to swell. Subsequently, the film was immersed in an aqueous solution of 0.3% iodine/potassium iodide (0.5/8 in weight ratio) and dyed while stretched to 3.5 times. The film was then stretched to a total stretch ratio of 6 times in an aqueous boric ester solution at 65° C. After the stretching, the film was dried in an oven at 40° C. for 3 minutes to give a PVA-based polarizer D. The resulting polarizer had a thickness of 23 μm.

(Preparation of Protective Film)

The adhesion facilitation-treated surface of a lactone ring structure-containing (meth)acrylic resin film with a thickness of 40 μm was subjected to a corona treatment. The corona-treated film was used as a protective film.

(Preparation of Adhesive to be Applied to Protective Film)

An ultraviolet-curable adhesive was prepared by mixing 40 parts by weight of N-hydroxyethylacrylamide (HEAA), 60 parts by weight of acryloylmorpholine (ACMO), and 3 parts by weight of a photo-initiator IRGACURE 819 (manufactured by BASF).

(Evaluation Method of Polyvinyl Alcohol Resin)

In the polyvinyl alcohol resin, the polymerization degree, the saponification degree, and the sodium acetate content at the time of powdering were measured in accordance with JIS K 6726.

(Preparation of Polyvinyl Alcohol-Based, Layer-Forming Material A)

A polyvinyl alcohol resin 250 g (polymerization degree: 2500, saponification degree: 99.8 mol %, sodium acetate content: 1.5 wt %) was placed in a 2 L beaker, and 250 g of methanol was added thereto. The mixture was allowed to stand for 2 days to obtain 500 g of a gel-like polyvinyl alcohol resin having a solid content of 50%. Subsequently, 500 g of methanol was added to the above beaker, and the mixture was stirred (60 rpm) for 20 minutes using a stirrer, followed by filtration and drying to remove methanol, thereby to perform the washing. This washing step was repeated multiple times until the content of sodium acetate reached the desired value. By the above washing method, a polyvinyl alcohol resin having a polymerization degree of 2500, a saponification degree of 99.8 mol %, and a sodium acetate content of 0.03 wt % was obtained. The obtained polyvinyl alcohol resin was dissolved in pure water to prepare an aqueous solution having a solid content concentration of 4 wt %.

(Preparation of Polyvinyl Alcohol-based, Layer-forming Materials B to J)

Polyvinyl alcohol-based, layer-forming materials B to J were prepared in the same manner as in the preparation of the polyvinyl alcohol-based, layer-forming material A, except that the kind (polymerization degree, saponification degree, sodium acetate content) of the polyvinyl alcohol resin to be used was changed and the washing was repeated until the content of sodium acetate in the polyvinyl alcohol resin reached a desired value in the preparation of the polyvinyl alcohol-based, layer-forming material A.

In Example 15, 5 parts by weight of methylol melamine (trade name "WATER SOL: S-695", manufactured by DIC Corporation) as an additive was blended with 100 parts by weight of the polyvinyl alcohol-based resin to prepare an aqueous solution (layer-forming material I) having a solid content concentration of 4 wt %.

(Active Energy Ray Irradiation)

Visible rays (gallium-containing metal halide lamp) were applied as active energy rays using the following conditions: irradiator, Light Hammer 10 manufactured by Fusion UV Systems, Inc; valve,Vvalve; peak illuminance, 1, 600 mW/cm$^2$; total dose, 1,000/mJ/cm$^2$ (wavelength 380-440 nm). The illuminance of the visible rays was measured using Sola-Check System manufactured by Solatell Ltd.

Comparative Example 1

<Preparation of One-side-protected Polarizing Film>

The protective film was bonded to the surface of the polarizing film of optical film laminate A0 with the ultraviolet-curable adhesive being applied to the surface in such a manner as to form a 0.5-μm-thick adhesive layer after curing. Subsequently, the adhesive was cured by the active energy ray irradiation. Subsequently, the amorphous PET substrate was removed, so that one-side-protected polarizing film having the thin polarizing film was obtained. The optical properties of resulting one-side-protected polarizing film were as follows: transmittance 42.8%, polarization degree 99.99%.

Example 1

<Preparation of Transparent Resin Layer-attached one-side-protected Polarizing Film: Corresponding to FIG. 2(A)>

The polyvinyl alcohol-based, layer-forming material A adjusted to 25° C. was applied to the surface (polarizer surface not provided with a protective film) of the polarizing film (polarizer) of the one-side-protected polarizing film obtained in Comparative Example 1 with a bar coater so as to have a thickness of 1.5 μm after drying, and dried with hot air at 60° C. for 1 minute to prepare a transparent resin layer-attached one-side-protected polarizing film. The obtained transparent resin layer-attached one-side-protected polarizing film had optical characteristics of a transmittance of 42.8% and a polarization degree of 99.99%.

Examples 2 to 15 and Comparative Examples 2 to 7

Transparent resin layer-attached one-side-protected polarizing films were prepared in the same manner as in Example 1, except that the type of the polarizer, the type of the transparent resin layer forming material (the saponification degree and polymerization degree of the polyvinyl alcohol resin, and the presence or absence of the additive are as shown in Table 1), and the thickness of the transparent resin layer in Example 1 were changed as shown in Table 1. The obtained transparent resin layer-attached one-side-protected polarizing films all had optical characteristics of a transmittance of 42.8% and a polarization degree of 99.99%.

The polarizing films obtained in the examples and the comparative examples were evaluated as described below. Table 1 shows the results. The evaluation was performed on the pressure-sensitive-adhesive-layer-attached polarizing films prepared as described below.

<Measurement of the Content of Boric Acid in Polarizer>

The polarizers obtained in the examples and the comparative examples were subjected to attenuated total reflection (ATR) spectroscopy using polarized light as the measurement light and using a Fourier transform infrared spectrometer (FTIR) (Spectrum 2000 (trade name) manufactured by PerkinElmer, Inc.), in which the boric acid peak (665 cm$^{-1}$) intensity and the reference peak (2,941 cm$^{-1}$) intensity were measured. The boric acid amount index was calculated from the formula below using the resulting boric acid peak intensity and reference peak intensity, and then the boric acid content (% by weight) was determined from the formula below using the calculated boric acid amount index.

(Boric acid amount index)=(the intensity of the boric acid peak at 665 cm$^{-1}$)/(the intensity of the reference peak at 2,941 cm$^{-1}$)

(Boric acid content (% by weight))=(boric acid amount index)×5.54+4.1

<Preparation of Acryl-based Polymer>

A monomer mixture including 99 parts of butyl acrylate and 1 part of 4-hydroxybutyl acrylate was added to a four-necked flask equipped with a stirring blade, a thermometer, a nitrogen gas inlet tube, and a condenser. On the basis of 100 parts (solids) of the monomer mixture, 0.1 parts of 2,2'-azobisisobutyronitrile as a polymerization initiator was further added together with ethyl acetate to the flask. While the mixture was gently stirred, nitrogen gas was introduced to replace the air in the flask. Subsequently, the mixture was subjected to polymerization reaction for 7 hours while the temperature of the liquid in the flask was maintained at around 60° C. Subsequently, ethyl acetate was added to the resulting reaction liquid, so that a solution of an acryl-based polymer with a weight average molecular weight of 1,400,000 was obtained with an adjusted solid concentration of 30%.

(Preparation of Pressure-sensitive Adhesive Composition)

An acryl-based pressure-sensitive adhesive solution was prepared by adding 0.1 parts of trimethylolpropane xylylene diisocyanate (TAKENATE D110N manufactured by Mitsui Chemicals, Inc.), 0.3 parts of dibenzoyl peroxide, and 0.075 parts of γ-glycidoxypropylmethoxysilane (KBM-403 manufactured by Shin-Etsu Chemical Co., Ltd.) to the acryl-based polymer solution based on 100 parts of the solids in the acryl-based polymer solution.

(Formation of Pressure-sensitive Adhesive Layer)

Subsequently, the acryl-based pressure-sensitive adhesive solution was uniformly applied with a fountain coater to the surface of a polyethylene terephthalate film (separator film) treated with a silicone release agent, and then dried in an air circulation-type thermostatic oven at 155° C. for 2 minutes to form a 20-μm-thick pressure-sensitive adhesive layer on the surface of the separator film.

<Preparation of Pressure-sensitive-adhesive-layer-attached Polarizing Films>

Subsequently, a pressure-sensitive-adhesive-layer-attached polarizing film was prepared by bonding the pressure-sensitive adhesive layer formed on the release-treated surface of the release sheet (separator) to the transparent resin layer of the polarizing film obtained in each example (but, on the polarizer side in Comparative Example 1).

<Combined Total Content of Sodium Acetate and Potassium Acetate in Transparent Resin Layer>

(1) The combined total content of sodium acetate and potassium acetate in the transparent resin layer was determined by measuring the amount of sodium (derived from sodium acetate) or the amount of potassium (derived from potassium acetate) in the transparent resin layer by TOF-SIMS.

(2) Polyvinyl alcohol resins whose sodium acetate contents were known in advance (sodium acetate contents: 0.39 wt %, 2.38 wt %, 4.87 wt %) were applied to a PET base material, and three kinds of films for calibration curve measurement each having a thickness of 5 μm were prepared.

Figure 3:
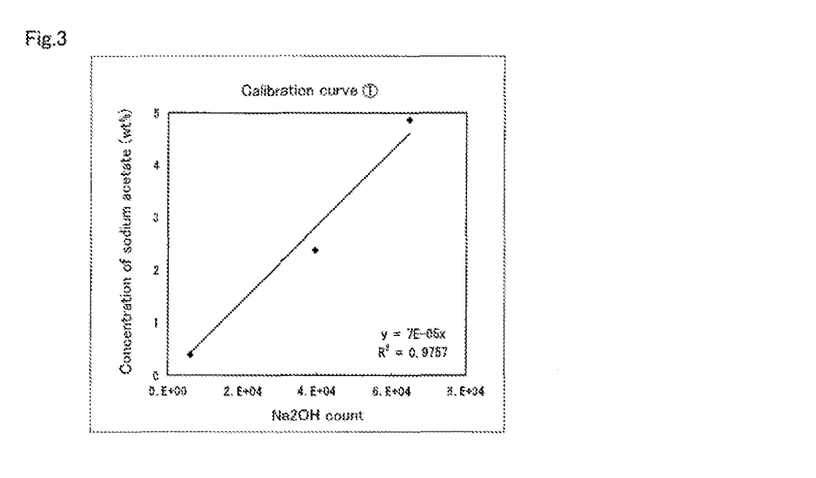
FIG. 3 is an example of a calibration curve used for measuring the content of sodium acetate or potassium acetate in the transparent resin layer.
Figure 4:
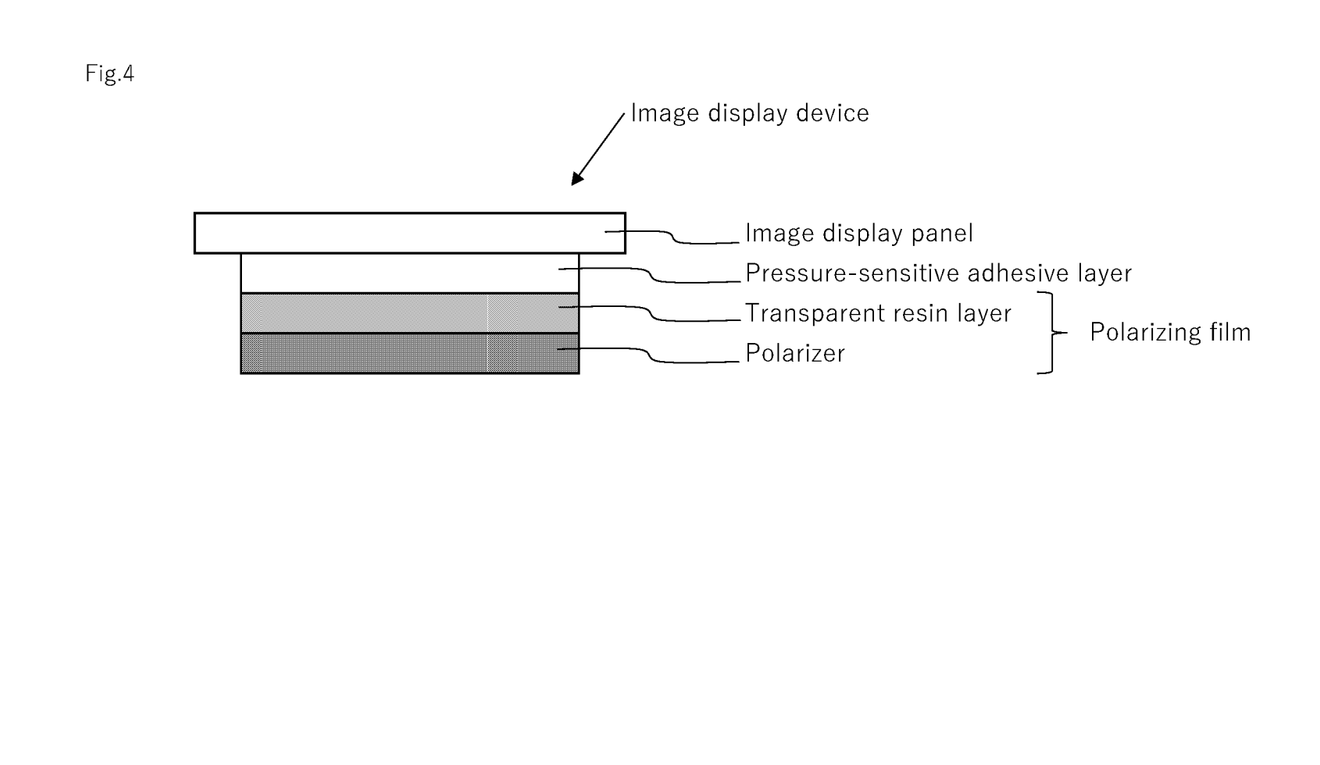
FIG. 4 shows an example of an image display device.

The TOF-SIMS measurement was performed on the three kinds of films, and the secondary ion intensity of $Na_2OH$ was plotted on the horizontal axis and the sodium acetate content (wt %) was plotted on the vertical axis, and then a calibration curve was prepared from the approximate straight line (FIG. 3).

Sputtering ion source of sample: C60
Primary ion source: Bi
Measuring device: TOF-SIMS 5 (manufactured by ION-TOF)
Measuring mode: High mass resolution
Measured area: 200 μm square
Detected ion: Positive (3) For the transparent resin layer of the polarizing film of each Example, TOF-SIMS was performed under the same measurement conditions as at the time of preparing the calibration curve, and the sodium acetate content was calculated from the calibration curve.

When potassium hydroxide was used for saponifying the polyvinyl alcohol resin, a film whose potassium acetate content was known was similarly prepared, and a calibration curve of the secondary ion intensity of $K_2OH$ on the horizontal axis and the potassium acetate content (wt %) on the vertical axis was prepared. From the calibration curve, the potassium acetate content was calculated. Further, when saponification of the polyvinyl alcohol resin was performed and both sodium hydroxide and potassium hydroxide were used, each calibration curve of sodium acetate and potassium acetate was prepared to calculate the combined total content of sodium hydroxide and potassium hydroxide.

<Moist Heat Resistance (Rate of Change in Polarization Degree (Optical Reliability Test))>

A piece with a size of 25 mm×50 mm (50 mm in the absorption axis direction) was cut from each resulting pressure-sensitive-adhesive-layer-attached one-side-protected polarizing film. The cut piece (sample) of the one-side-protected polarizing film was stored in a thermo-hygrostat at 85° C. and 85% RH for 150 hours. The polarization degree of the one-side-protected polarizing film sample was measured before and after the storage using an integrating sphere-equipped spectral transmittance meter (DOT-3C manufactured by Murakami Color Research Laboratory Co., Ltd.), and used for the calculation of: rate (%) of change in polarization degree=(1−(the polarization degree after the storage)/(the polarization degree before the storage)).

The polarization degree P is calculated from the formula below using the transmittance (parallel transmittance Tp) of a laminate of the same two polarizing films with their transmission axes parallel to each other and the transmittance (crossed transmittance Tc) of a laminate of the same two polarizing films with their transmission axes orthogonal to each other. Polarization degree P (%)={(Tp−Tc)/(Tp+Tc)}$^{1/2}$×100

Each transmittance was expressed as the Y value, which was obtained through luminosity correction using the two-degree field (illuminant C) according to JIS Z 8701 when the transmittance for completely polarized light obtained through a Glan-Taylor prism polarizer was normalized to 100%.

Table 1 shows the rates of change in polarization degree and the results of evaluation of the rates of change based on the following criteria.

⊙: The rate of change in polarization degree is 0.1% or less.
○: The rate of change in polarization degree is more than 0.1% to 0.5%.
Δ: The rate of change in polarization degree is more than 0.5% to 1.0%.
Δx: The rate of change in polarization degree is more than 1.0% to 1.5%.
x: The rate of change in polarization degree is more than 1.5%.

<Crack Resistance>

A piece with a size of 400 mm wide×708 mm long (400 mm in the absorption axis direction) and a piece with a size of 708 mm long×400 mm wide (708 mm in the absorption axis direction) were cut from each resulting pressure-sensitive-adhesive-layer-attached polarizing film. The cut pieces were bonded in the directions of crossed Nicols to both sides of a non-alkali glass of 402 mm wide×710 mm long×1.3 mm thick to form a sample. The sample was stored in an oven at 95° C. for 250 hours. Subsequently, the sample was taken out and then visually observed for whether cracking occurred in the pressure-sensitive-adhesive-layer-attached polarizing film. This test was performed using 10 pieces for each sample. The number of cracked sample pieces was counted.

TABLE 1

| | | Polarizing film | | | | | | | | Evaluation | | | |
|---|---|---|---|---|---|---|---|---|---|---|---|---|---|
| | | Constitution | | Transparent resin layer | | | | | | Optical characteristics | | Crack resistance | |
| | | | | Material | | | | | | | Optical reliability (Moisture resistance) | | Number of film sheets of crack occurrence |
| | | | | Polyvinyl alcohol-based | | | | | | | | | |
| | | | | Polyvinyl alcohol | | | | Total amount of sodium acetate and potassium acetate (wt %) | | | | | |
| | Kind | Polarizer thickness (μm) | Boric acid content (wt %) | Kind | Saponification degree (mol %) | Polymerization degree | Additive | | Thickness (μm) | Judgement | Change rate of polarization degree (%) | Judgement | |
| Example 1 | A0: One-side protected | 5 | 16 | Layer-forming material A | 99.7 | 2500 | — | 0.03 | 1.5 | ⊙ | 0.04 | ○ | 0 |
| Example 2 | A1: One-side protected | 5 | 14 | Layer-forming material A | 99.7 | 2500 | — | 0.03 | 1.5 | ○ | 0.11 | ○ | 0 |
| Example 3 | A2: One-side protected | 5 | 20 | Layer-forming material A | 99.7 | 2500 | — | 0.03 | 1.5 | ⊙ | 0.02 | Δ | 1 |
| Example 4 | B: One-side protected | 7 | 16 | Layer-forming material A | 99.7 | 2500 | — | 0.03 | 1.5 | ⊙ | 0.08 | ○ | 0 |
| Example 5 | C: One-side protected | 12 | 16 | Layer-forming material A | 99.7 | 2500 | — | 0.03 | 1.5 | ⊙ | 0.06 | ΔX | 2 |
| Example 6 | A0: One-side protected | 5 | 16 | Layer-forming material A | 99.7 | 2500 | — | 0.03 | 4.5 | ΔX | 1.56 | ○ | 0 |
| Example 7 | A0: One-side protected | 5 | 16 | Layer-forming material B | 99.7 | 2500 | — | 0.3 | 2.0 | ⊙ | 0.04 | ○ | 0 |
| Example 8 | A0: One-side protected | 5 | 16 | Layer-forming material C | 99.7 | 2500 | — | 0.6 | 2.0 | ○ | 0.15 | ○ | 0 |
| Example 9 | A0: One-side protected | 5 | 16 | Layer-forming material A | 99.7 | 2500 | — | 0.8 | 1.5 | ○ | 0.20 | ○ | 0 |
| Example 10 | A0: One-side protected | 5 | 16 | Layer-forming material D | 99.0 | 2500 | — | 0.5 | 2.0 | Δ | 0.52 | ○ | 0 |
| Example 11 | A0: One-side protected | 5 | 16 | Layer-forming material E | 96.0 | 2500 | — | 0.5 | 0.8 | ΔX | 1.24 | ○ | 0 |
| Example 12 | A0: One-side protected | 5 | 16 | Layer-forming material E | 96.0 | 2500 | — | 0.5 | 0.3 | Δ | 0.82 | ΔX | 2 |
| Example 13 | A0: One-side protected | 5 | 16 | Layer-forming material E | 96.0 | 500 | — | 0.5 | 0.8 | ΔX | 1.13 | Δ | 1 |
| Example 14 | A0: One-side protected | 5 | 16 | Layer-forming material F | 99.7 | 4000 | — | 0.3 | 2.0 | ⊙ | 0.10 | ○ | 0 |
| Example 15 | A0: One-side protected | 5 | 16 | Layer-forming material G | 99.7 | 2500 | WS | 0.3 | 1.5 | ○ | 0.12 | ○ | 0 |

TABLE 1-continued

| | Polarizing film | | | Transparent resin layer | | | | | Evaluation | | | |
|---|---|---|---|---|---|---|---|---|---|---|---|---|
| | Constitution | | | Material Polyvinyl alcohol-based | | | | | Optical characteristics | | Crack resistance | |
| | | | | Polyvinyl alcohol | | | Total amount of sodium acetate and potassium acetate (wt %) | | | Optical reliability (Moisture resistance) | | Number of film sheets of crack occurrence |
| Kind | Polarizer thickness (μm) | Boric acid content (wt %) | Kind | Saponification degree (mol %) | Polymerization degree | Additive | | Thickness (μm) | Judgement | Change rate of polarization degree (%) | Judgement | |
| Comparative Example 1 | A0: One-side protected | 5 | 16 | None | | | | | | 0.10 | X | 10 |
| Comparative Example 2 | A0: One-side protected | 5 | 16 | Layer-forming material H | 86.0 | 2500 | — | 0.5 | 2.0 | X | 5.10 | ○ | 0 |
| Comparative Example 3 | A0: One-side protected | 5 | 16 | Layer-forming material C | 99.7 | 2500 | — | 0.6 | 0.1 | ○ | 0.12 | X | 5 |
| Comparative Example 4 | A0: One-side protected | 5 | 16 | Layer-forming material I | 99.7 | 2500 | — | 2.0 | 2.0 | X | 3.58 | ○ | 0 |
| Comparative Example 5 | A0: One-side protected | 5 | 16 | Layer-forming material A | 99.7 | 2500 | — | 0.3 | 8.0 | X | 3.40 | ○ | 0 |
| Comparative Example 6 | D: One-side protected | 23 | 16 | Layer-forming material A | 99.7 | 2500 | — | 0.3 | 2.0 | ΔX | 1.00 | X | 10 |
| Comparative Example 7 | A0: One-side protected | 5 | 16 | Layer-forming material A | 99.7 | 2500 | — | 1.2 | 1.5 | X | 2.40 | ○ | 0 |

In Table 1, WS represents methylol melamine: Water Sol S-695 (manufactured by DIC Corporation).

DESCRIPTION OF REFERENCE SIGNS

1 Polarizer
2 Transparent resin layer
3 Resin base material
4 Protective film
10 Polarizing film
11 Polarizing film

The invention claimed is:

1. A polarizing film having a transparent resin layer on at least one side of a polarizer containing a polyvinyl alcohol-based resin, wherein the transparent resin layer has a thickness of 0.2 μm or more and is formed from a layer-forming material containing a polyvinyl alcohol-based resin having a saponification degree of 96 mol % or more, and wherein a combined total content of sodium acetate and potassium acetate contained in the transparent resin layer is less than 1 wt %.

2. The polarizing film according to claim 1, wherein the combined total content of sodium acetate and potassium acetate contained in the transparent resin layer is 0.5 wt % or less.

3. The polarizing film according to claim 1, wherein the combined total content of sodium acetate and potassium acetate contained in the transparent resin layer is 0.3 wt % or less.

4. The polarizing film according to claim 1, wherein the polyvinyl alcohol-based resin in the transparent resin layer has a saponification degree of 99 mol % or more.

5. The polarizing film according to claim 1, wherein the polyvinyl alcohol-based resin in the transparent resin layer has a saponification degree of 99.5 mol % or more.

6. The polarizing film according to claim 1, wherein the polyvinyl alcohol-based resin in the transparent resin layer has an average polymerization degree of 2000 or more.

7. The polarizing film according to claim 1, wherein the transparent resin layer has a thickness of 0.4 μm or more.

8. The polarizing film according to claim 1, wherein the transparent resin layer has a thickness of 6 μm or less.

9. The polarizing film according to claim 1, wherein the polarizer has a thickness of 15 μm or less.

10. The polarizing film according to claim 1, wherein the polarizer contains boric acid in an amount of 20 wt % or less based on the total amount of the polarizer.

11. The polarizing film according to claim 1, wherein the polarizer is designed to have a single-body transmittance T and a polarization degree P representing optical properties satisfying the condition of the following formula: $P>-(10^{0.9297T-42.4}-1)\times 100$ (when T<42.3) or P≥99.9 (when T>42.3).

12. The polarizing film according to claim 1, which has a protective film.

13. A pressure-sensitive-adhesive-layer-attached polarizing film having the polarizing film according to claim 1 and a pressure-sensitive adhesive layer.

14. The pressure-sensitive-adhesive-layer-attached polarizing film according to claim 13, wherein a separator is laminated on the pressure-sensitive adhesive layer.

15. The pressure-sensitive-adhesive-layer-attached polarizing film according to claim 14, which is in a form of a roll.

16. A method for continuously producing an image display device, the method comprising the steps of:
    unwinding the pressure-sensitive-adhesive-layer-attached polarizing film from the roll of the pressure-sensitive-adhesive-layer-attached polarizing film according to claim 15;
    feeding the pressure-sensitive-adhesive-layer-attached polarizing film with the separator; and
    continuously bonding the pressure-sensitive-adhesive-layer-attached polarizing film to a surface of an image display panel with the pressure-sensitive adhesive layer interposed therebetween.

17. An image display device having the pressure-sensitive-adhesive-layer-attached polarizing film according to claim 13.

18. An image display device having the polarizing film according to claim 1.

* * * * *